United States Patent
Rupnik

(10) Patent No.: US 11,770,878 B2
(45) Date of Patent: Sep. 26, 2023

(54) TUBULAR CONCENTRATOR FOR CONCENTRIC RADIATION OF ELECTROMAGNETIC WAVES

(71) Applicant: Carlo Rupnik, Budva (ME)

(72) Inventor: Carlo Rupnik, Budva (ME)

(73) Assignee: Carlo RUPNIK, Budva (ME)

( * ) Notice: Subject to any disclaimer, the term of this patent is extended or adjusted under 35 U.S.C. 154(b) by 258 days.

(21) Appl. No.: 16/067,134

(22) PCT Filed: Dec. 28, 2016

(86) PCT No.: PCT/IT2016/000310
§ 371 (c)(1),
(2) Date: Jun. 29, 2018

(87) PCT Pub. No.: WO2017/115394
PCT Pub. Date: Jul. 6, 2017

(65) Prior Publication Data
US 2019/0014618 A1    Jan. 10, 2019

(30) Foreign Application Priority Data

Dec. 29, 2015 (IT) .......................... 102015000088217

(51) Int. Cl.
*H05B 3/00* (2006.01)
*C02F 1/32* (2023.01)

(52) U.S. Cl.
CPC ........... *H05B 3/0033* (2013.01); *C02F 1/325* (2013.01); *C02F 2201/003* (2013.01);
(Continued)

(58) Field of Classification Search
CPC ................ C02F 1/325; C02F 2201/003; C02F 2201/009; C02F 2201/3222;
(Continued)

(56) References Cited

U.S. PATENT DOCUMENTS 4,945,290 A * 7/1990 Eliasson ............... H01J 65/046
                                                                  315/246
6,005,225 A * 12/1999 Kowalski .......... H01L 21/67098
                                                                  219/390
(Continued)

FOREIGN PATENT DOCUMENTS

CN        1141419      * 1/1997
CN      204014119      * 12/2014
(Continued)

*Primary Examiner* — Ibrahime A Abraham
*Assistant Examiner* — Frederick F Calvetti

(57) ABSTRACT

The invention relates to an electric machine (fixed, mobile or portable) suitable to the physical, dynamic, continuous conditioning of materials having the ability to absorb electromagnetic radiation, which have the need to be treated through the irradiation of UV or IR, even without entering into contact with the machine and this also through the vacuum. The invention mainly uses the Lambert and Stefan-Boltzmann postulates, or rather the physical assumptions of the transmission of energy by radiation and in particular the concentration and the emission proximity of energy between transmitter and receiver (which varies with the square of the distance) and the emission intensity (which varies with the fourth power of the temperature). The extremely small distances between transmitter and receiver of electromagnetic energy and the cylindrical shape and concentric electromagnetic emission source (reflected from the outside towards the centre) are the main essence and novelty of the invention. The electric machine, the section of which is represented in the attached drawing of which are hereby provided in the description the letters as a reference, is composed of a suitable current generator that feeds an emitter of electromagnetic waves (EMW) represented by a coiled heating wire (heater function) or by a strip of LEDs (germicidal function) (E), which envelops a fused quartz tube (or a substitute material) of suitable thickness (D), (Continued)

which in turn can contain an internal (or more) further tube (C) of the same or similar transparent material of the first, adapted to the passage of materials to be treated (A); the tube (D) wrapped with the spiral emitter (E) is in turn encased by a tube (F) in suitably appropriate material to shield electromagnetic emissions towards the outside. Such screening tube will (eventually) in turn be inserted in a relatively thick insulating cup (G), coated in turn with reflecting material (H), to further isolate and insulate the system as much as possible from the external environment.

9 Claims, 2 Drawing Sheets

(52) U.S. Cl.
CPC .............................. *C02F 2201/009* (2013.01); *C02F 2201/3222* (2013.01); *C02F 2201/3228* (2013.01); *C02F 2303/04* (2013.01); *H05B 2203/032* (2013.01); *Y02A 20/212* (2018.01); *Y02W 10/37* (2015.05)

(58) Field of Classification Search
CPC ......... C02F 2201/3228; C02F 2303/04; H05B 2203/032; H05B 3/0033; Y02A 20/212; Y02W 10/37
See application file for complete search history.

(56) References Cited

U.S. PATENT DOCUMENTS

| | | | | |
|---|---|---|---|---|
| 6,398,970 | B1* | 6/2002 | Justel | C02F 1/325 210/198.1 |
| 6,633,109 | B2* | 10/2003 | Falkenstein | A61L 2/10 313/163 |
| 6,674,054 | B2* | 1/2004 | Boyers | C03C 23/00 134/102.1 |
| 6,734,631 | B2* | 5/2004 | Juestel | C09K 11/7709 313/483 |
| 6,777,879 | B2* | 8/2004 | Juestel | C09K 11/7783 252/301.4 P |
| 7,298,077 | B2* | 11/2007 | Justel | C09K 11/7774 252/301.4 P |
| 7,687,997 | B2* | 3/2010 | Gaertner | H01J 61/045 313/114 |
| 8,080,165 | B2* | 12/2011 | Forney | A23L 3/28 210/748.11 |
| 9,159,545 | B2* | 10/2015 | Hishinuma | C09K 11/778 |
| 2009/0081340 | A1* | 3/2009 | Forney | A23L 3/28 210/748.11 |
| 2011/0194845 | A1* | 8/2011 | Wang | F24H 1/142 392/468 |
| 2012/0228236 | A1* | 9/2012 | Hawkins, II | C02F 1/725 210/748.14 |
| 2014/0050612 | A1* | 2/2014 | Kneissl | A61L 2/10 250/435 |
| 2014/0178057 | A1* | 6/2014 | Hayden | F24H 9/1818 392/480 |

FOREIGN PATENT DOCUMENTS

| | | |
|---|---|---|
| EP | 0867916 | 9/1998 |
| WO | 02089532 | 11/2002 |
| WO | 2011057015 | 5/2011 |

* cited by examiner

TUBULAR CONCENTRATOR FOR CONCENTRIC RADIATION OF ELECTROMAGNETIC WAVES

Foreword: field of technique to which the invention refers

The use of electromagnetic waves (EMW) radiation systems, based on plates with or without the use of quartz tubes with internal resistance (IR) or mercury UV emitters, as well as the armoured resistance, or the lamps made of quartz tubes, are known systems for both industry and equipment so-called "consumer appliances" (hot plates, stoves, heaters and wall heaters, ceiling heaters, sterilizers UV-C for environment, tools, water, aquariums, etc.).

DESCRIPTION OF THE DRAWING

The letters of the drawing are corresponding to the following descriptions.

THE EXISTING TECHNIQUE AND DIVERSITY STATE

Figure 1:
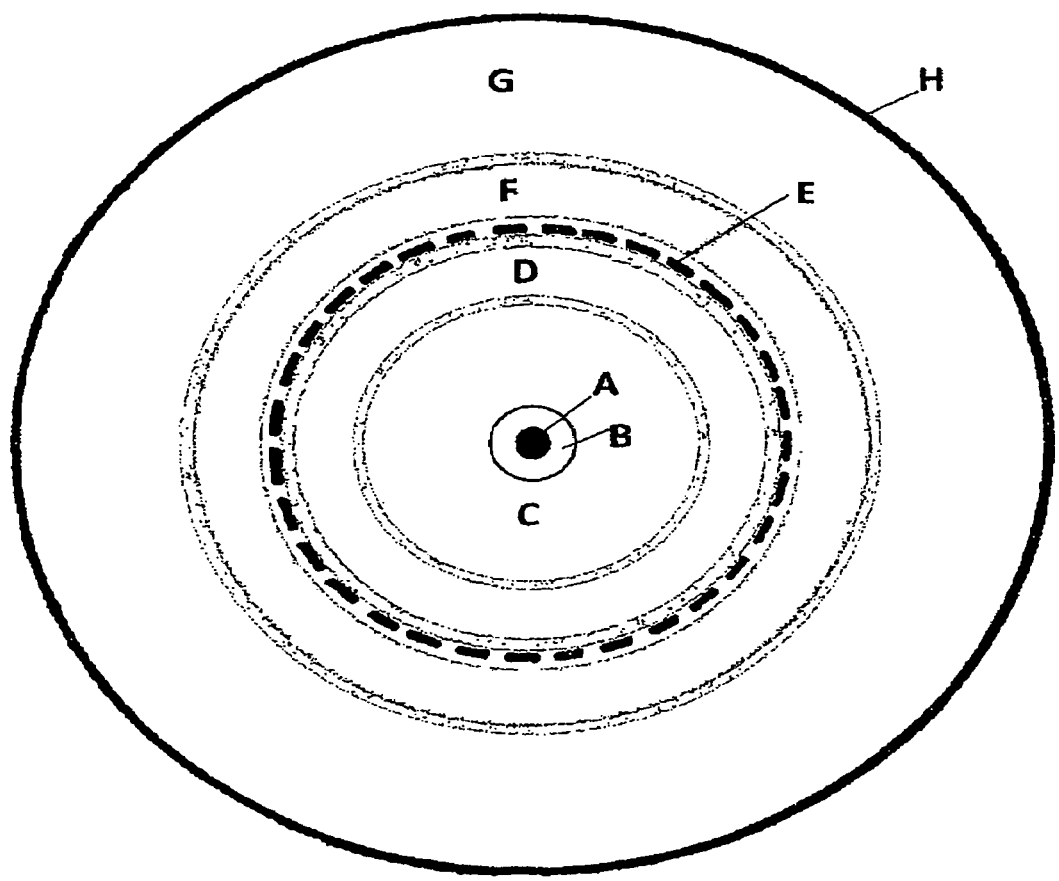
FIG. 1/2: shows a tubular concentrator
A. material to be treated
B. void/empty
C. 2-fused quartz tube
D. 1-fused quartz tube
E. IR or UV emission device
F. reflective ceramic casing
G. insulating shell
H. metal sheet FIG. 2/2: shows a tubular concentrator with a longitudinal cut
A. material to be treated
B. void/empty
C. 2-fused quartz tube
D. 1-fused quartz tube
E. IR or UV emission device
F. reflective ceramic casing
G. insulating shell
H. metal sheet
L. longitudinal
Figure 2:
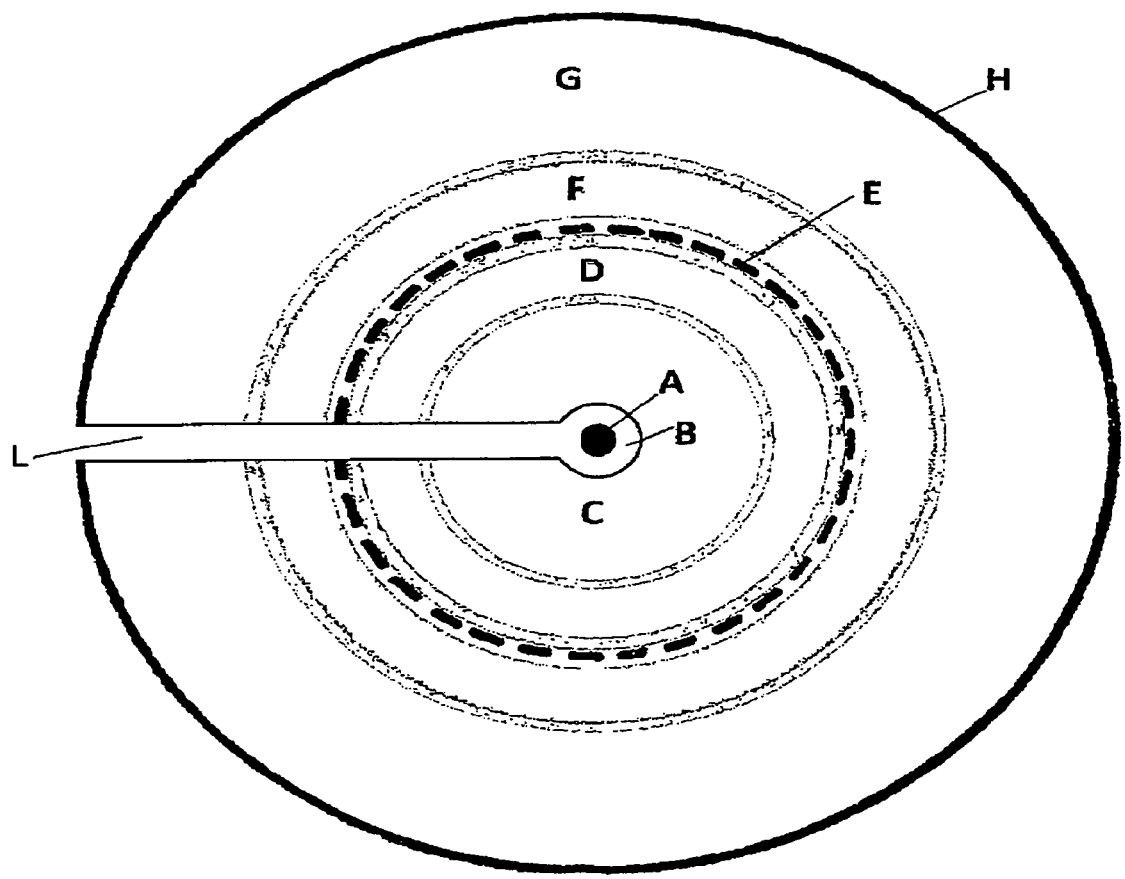

In a general sense today's invention bases its foundations on topics well known to the state of the art and some patents have even been released in the nineteenth century (i.e. Jan. 27, 1898—U.S. Pat. No. 6,313,60 A).

It is useful to note that, while the principle of irradiation and manufacturing techniques are the same, the current technological status of the art is better described in the two main groups of EMW frequencies embraced by the hereby described apparatus: these are the heating infrared systems and the germicidal treatment systems by means of the short wave length ultraviolet light (UV-C). They are placed at the two extremes of the EMW wavelength scale affecting the present invention, namely the electromagnetic field lies between 100 nanometres (UV-C) and the millimetre (IR-C) wavelength.

Infrared

The present state of science and industrial production knows the tubular or microtubular heaters used in many industrial environments, such as hot runner injection systems (so-called "Hot Runners") for the plastics moulding, for the vulcanization presses, welding machines and for the hot branding, as well as for the heating of vacuum furnaces, sterilization systems and many other systems that require small heating tubes.

In part conceptually similar are also the heaters as the patent n. EP 0287772 A1 (Heating element for household electrical appliances) as the water to be heated should flow within the resistance, instead of outside.

Also patent U.S. Pat. No. 6,674,054 B2 (Method and apparatus for heating a gas-solvent solution) shows remarkable similarities with today's invention but we will see below to highlight the peculiar differences.

These mentioned heaters designed for using the heating energy towards the interior of the machine, rather than the outside, are perhaps the applications that are closest to today's invention for the infrared part but there is the opportunity to consider that today's invention assembles at the same time:

i. the electromagnetic radiation;
ii. a frequency spectrum between infrared and ultraviolet;
iii. the absence of any kind of filters between the emitter and the receiver;
iv. the intimate proximity between the transmitter and receiver;
v. the reflection of the radiation towards the interior of the machine;
vi. the thermal insulation to limit the heat conduction towards the outside;

as disclosed in detail below, just to highlight the differences in the following construction details and the fundamental concept, the comparison shows that the already known heaters:

i. they are manufactured by the use of so-called "armored resistors" instead of the resistive wire at sight; in fact, in the cited armored resistors (i.e. EP 0287772 A1), the resistive wire is drowned in a magnesium (MgO) sand which has the electric insulating function beside the one of thermal conductor;
ii. the emitting source EMW is not to be so relatively "close" to the materials to be heated;
iii. are not equipped with a screen that reflects the EMW of the infrared spectrum towards the inside of the tube, if not by means of a metal band that reflects yes but scatters the radiation to thermal conduction first and then through the radiant surface, a large amount of heat towards the 'exterior, reducing energy efficiency.
iv. structures are conceived and designed for relatively small lengths that do not accord with some industrial need for measures also well above the meter.
v. The U.S. Pat. No. 6,674,054 patent above mentioned does not use the use of irradiation if not in an embodiment in which separates the heating pipes from the material to be heated, flowing in the main pipe, gathering all in a further tube, with greater distance, different incidence and less efficiency, in addition to the construction costs higher than in today's invention;
vi. always the above patent, when applied on the quartz tube the inductive resistors or conductors, does not transfer the energy by means of irradiation but by conduction or electromagnetic induction, and in fact is not specified, the quartz tube used (if translucent, transparent or opaque);
vii. a comparison with the existing state of the art should be considered not so much with the individual peculiarities of the mentioned machines as the fact to compare them with today's invention which, in one machine collects a series of coexisting and cooperating functions between them.

The combination of these differences gives rise to a remarkable diversity of the various electrical mentioned machines characterizing the innovation of the invention here described.

The present invention in fact shows a radiator, whose EMW transmitter combines all of the following characteristics simultaneously:
i. It is adherent to the quartz substrate, and therefore is close to the material to be treated;
ii. It is devoid of shielding or filters against the material to be treated;
iii. It is equipped with a reflective screen for the radiations, placed around the emitter;
iv. It is insulated and shielded to the outside to prevent and/or slow conduction and radiation of energy;
v. It is mainly based on radiation instead of conduction/convection/induction (although all present);
vi. it is useful to process materials in solid, liquid, gaseous and powdery forms;
vii. It is not aimed only for heat purposes but to the entire range in the spectrum from UV to IR;
viii. for its particular characteristics it is aimed at energy saving, and consequently at a high yield.

The particular nature of the emitter denotes a higher entry speed regime at the working temperature (lower thermal inertia): this happens precisely because devoid of screens or filters of any kind towards the target side, and because of the different winding of resistive material which take place "naked", around the fused quartz tube, instead to be housed inside it or drowned in the magnesia sand in a steel casing. The tubular heaters, known at the current state of technology, are grounded on the armoured resistors which interpose two different screens between the resistive wire, a source of infrared emission, and the material to be heated; these screens are constituted by the layer of magnesium oxide (MgO) used to electrically isolate the winding of resistive wire and the external metallic container (generally made of steel or other metals like).

The characteristic properties of MgO sands are those of electrically insulate the resistive wire which is traversed by electrical current and the metal container (generally of steel nature), as well as those to transmit by thermal conduction the Joule energy resulting from the powered resistors (it should be minded that we are speaking of thermal conduction, no heat radiation as in today's invention).

It is therefore evident that the heat transmission of these armoured heaters occurs only partially to radiation (irradiation) but rather, and above all, by conduction and convection; however, the aspect that differentiates this type of heaters with the invention is represented by the difference of thermal inertia: the microtubular heaters are inherently subject to greater thermal inertia in relation to today's invention, which instead does not oppose whatsoever filters (quartz is perfectly transparent to infrared and ultraviolet radiation), and therefore immediately radiates on the material in transit in the tube (transparent) its electromagnetic energy and this happens, even in the presence of vacuum, at the speed of light (the same principle of global warming originated from the sun).

In fact, mainly exploiting the Lambert and Stefan-Boltzmann postulates, today's invention, at the same electric power applied to the machine, is able to transfer more energy to the material to be heated, when compared with the current state of the art and technologies. The thermal conductivity of the said MgO and metal container is on average estimated at around 50 (W/(m-K)): this is the additional barrier between the EMW emitter and material to be treated, when compared with the invention.

There are products that use quartz tubes in which the materials to be heated are sliding in them but the source of emission of electromagnetic radiation, which is also arranged circularly with respect to said quartz tube, remains embedded in the "insulating" walls of the casing, carrying the distance between emitter and user to several centimetres, reducing therefore, at least with quadratic factors, the efficiency of the machine where it was compared with today's solution.

These considerations are also valid for those few heating products which offer a constructive technology similar to today's discover, with the infrared emitter arranged concentrically outward with respect to the materials to be treated and which sometimes also use a small central tube in translucent quartz in which slide the wires to be heated but which differ from today's discover for the relatively large distance between the emission source (resistance) and material to be heated (we are speaking of at least a few centimetres). Today's invention, having the EMW emission source in contact with the tube in which the materials to be heated are sliding, increases the efficiency of the machine with the square of the distance and continuously reflects towards the centre of the duct all the radiation not absorbed by the treated materials with a constant redundant effect.

Germicidal Ultraviolet

The germicidal lamp has long been known and is normally used in many fields ranging from the drinking to the waste waters, as well as the disinfection of the surgery rooms and the tools contained and used therein, as well as in the treatment of other beverages for human and animal consumption.

For actual applications the present known conventional technique foresees the manufacture of bulbs very similar to fluorescent lamps or, in recent history, by means of light emitting diodes, commonly called LEDs (light emitting diodes) still not widespread, however.

The so-called "conventional" lamps, low and medium pressure, are constructed by exploiting the ionisation of mercury vapours but, instead of using a conventional boronsilicate glass, which would be opaque to the ultraviolet wavelengths, they employ tubes made of very pure fused quartz ($SiO_2$) as containers of the lamp itself: in short, in other words, the use of germicidal lamps are enclosed in a phial of pure fused quartz.

The use of such lamps with liquids is basically achieved in two ways:
i. the positioning of the lamps above the materials to be sterilized or, generally, in the environments to be sterilized;
ii. they are inserted into a container (generally) of tube-shaped steel, with two perpendicular flanges at the ends of the external cylindrical surface, which act as inlet and outlet of the fluids, so as to screen the harmful UV-C radiation useful for the sterilizing effect. The centre of the tube is reserved for the insertion of the germicidal lamp which projects from the two ends of the cylinder.

It is therefore normal to observe that, in the first system (external positioning) the emission points remain particularly far away from the bodies to be sterilized and the sterilization is performed by a single angle (except multiplying the lamps) while in the second solution (container), in addition to having only one angle of the source radiant light, the liquids are forced to particular deviations which cause the pressure drop in the pressure of the circulating fluid, as well as the homogeneity of the treatment remains incomplete for the different distances of the radiation absorption of liquids with respect to the emission source.

Description of Concentrated Radiant Heater for the Concentric Radiation of Electromagnetic Waves The electric machine (fixed, mobile or portable) is used to irradiate a material in solid, liquid or gaseous form or in a mixture of these, by means of EMW designed to deal with it or change the physical state, through the use of the physical principle of electromagnetic radiation.

The absence of contacts with heating elements (heat generators or electrodes) avoids the typical problems of resistive heaters, where otherwise applicable, as in the example of metal wires. The resistive heaters are in fact limited in their use only to conductive materials (Joule effect) and therefore not usable for the almost entire range of textile materials and minerals; another important problem existing in the resistive heaters is due by the action of the arcs inevitably produced in the coupling with the electric poles from which the Joule heating energy is applied to, which produce molten material craters which ruin the surface of the heated product (often rendering it unusable).

Very often this electric stress also leads to a situation of "descaling" (flakes of oxides that detach from the surface of the wires), especially for those metal materials previously subjected to thermal treatment to change the metallurgical characteristics (annealing for changing the strength, elongation and yield strength);

Such "descaling" prevents the correct co-extrusion of the wires, thus making unusable the resistive wire heating system: conversely today's invention avoids these problems.

The particularity of this electric machine also concerns the possibility to heat/treat those materials which otherwise might be heated by convection or by conduction but with much lower energy yields than the system of the present patent.

As many times evidenced the machine has a remarkable efficiency: it can be easily intuited by observing the peculiar constructive characteristics that are considered useful to list hereunder:

i the coaxial construction of the EMW emitting bodies and the treated materials, involve an energy concentration towards the centre of the duct in which the material to be irradiated flow;
ii the more reflective materials will be continuously irradiated due to the reflexivity of the walls of the machine which will bounce again at the centre the reflected energy;
iii the construction by means of suitable material, in particular quartz materials for IR and UV energy transmission produced by special radiators, as well as through clear, reflective ceramic sheaths (toward the centre), are designed to contain inside the machine energy loss;
iv the invention has only two relatively "small" openings, the entrance and exit of the system, greatly limiting the dispersion of the energy both by conduction and by convection since the entire outer surface of the electrical machine will be abundantly and suitably insulated.

The flexibility of the length of the machine, that each designer can choose according to its desired aims, allows to use the invention in many different systems, both for the virtual "lack of contact" between materials to be treated and radiating elements, and the sliding speed of the materials inside it, which can also be very high because the transfer of the radiated energy occurs at the speed of light and varies "only" in function of the power of absorption of different materials.

It will also be much easier and less expensive than other systems, slide gases simultaneously (maybe inert) within the passage of the wires concentric pipe (or other materials).

Only by way of example one can cite the preheating apparatus of the metal wires used in galvanizing plants but also in lacquering systems of electric wires or polymeric coating with co-extrusion processes.

The useful temperature limits are those relating to the materials which are used, but the aforementioned quartz and alumina, melt at 2000-C. and 2070-; it is useful to recall that in fact the electronics industry uses since decades translucent quartz crucibles for melting inside them (at 1450-C.) silicon, which then will be used for the production of electronic chips.

As in physics the relevant elements to the transfer of energy between two bodies, according to the principle of irradiation, are based on a number of variables such as:
  i. composition of matter of the bodies
  ii. the form of their surface
  iii. colour of the surface
  iv. wavelengths irradiated
  v. irradiation angle
  vi. radiation intensity.

the fact of having an emitter of infrared rays (or UV) disposed on the entire outer circumference of the material to be treated, allows to have constantly perpendicular infrared rays on the object to be treated (heat or sterilize) increasing the amount of energy transmitted the same material as compared to other treatment systems.

The most important novelty, generally speaking, can be represented by the concept of having reversed the positions of the emission sources of electromagnetic radiation with respect to the materials treated: up to yesterday the emission sources were placed inside a quartz cylinder and the material to be treated on the outside; today the invention demonstrates the ability to insert inside the quartz tube the material to be treated which is enveloped by the electromagnetic source that radiates it, which surrounds it completely at a very close range without any kind of filter interposed in between.

In fact, up to the current state of the art, the emission sources (whether they were IR rather than UV) were housed inside a quartz tube, emitting towards the outside of the same tube their electromagnetic radiation (IR and UV) forcing the use of a number of lamps in order to obtain conditions similar to those shown in the invention: thus, more space, more energy, more dispersion and less effectiveness of angular penetration.

Such latter most important evolution of the technique allows a much closer positioning to the electromagnetic emission source of the material to be treated, so as to better exploit the physical postulates (Lambert/Stefan-Boltzmann), gaining in efficiency of the electric machine if it was to be compared with other heating systems which intrude significantly greater distances between emitters and receivers of EMW or intruding third materials, non-transparent to radiation but harnessing the principles of thermal conductivity instead of the thermal radiation.

Summarizing, the previously described "hot runners", even if in contact with the objects to be heated, they interpose a layer of material "non-transparent" between the emitter and receiver of EMW, while the other two mentioned systems, simply interpose a relatively large distance, highlighting the "newness" of the invention represented today from associating concentricity at close range joined by the reflection of the outer tube (F) to the emitter of EMW with a concentration of the rays almost exclusively addressed within the irradiating system.

Developments of the Invention Compared to the State of the Art

Despite the electric machine (static) uses common industry components (and not only), for the purpose of heating or electromagnetic radiation, the novelty requirement is met mainly through the inversion of the positioning of the various components useful to the realization of the electrical machine itself as well as the extreme approximation of the emitter to the receiver, combined with a highly reflection system.

The particular structure of the invention, with the material to be heated/treated (A) located at the centre of the pipe (C) allows the same material sliding into it to be hit always perpendicularly from radiation (UV or IR), thus exploiting the best physical location for thermal and UV energy exchange; also the reflected EMW within the opaque tube will contribute greatly to the energy transfer to the treated material.

Systems of polymers forming, of paint drying, surface preparation (ie screen printing) already use these systems but today's invention greatly enhances the energy used because it focuses solely and exclusively on the (moving) material to be heated (to be these: wires, liquids, dust, gases or other materials).

Today's invention in facts, having the emitter (E) of the electromagnetic radiation (IR and UV) that externally surrounds the tube (D—made of transparent materials to IR and UV) in which runs the materials to be treated, obtains the following advantages and improvements:
  i. the points of emission of radiation are consistently "close" to the materials to be treated (starting with tenths of a mm), making the most of the energy emitted available;
  ii. the radiation points mainly affecting the material at a perpendicular angle and the radiation is constantly reflected within the 360- of the tube by way of the screens placed externally to the coverage of the radiating spiral (either IR or UV);
  iii. the section of passage of the material volume is perfectly cylindrical and, during operation of the machine, each molecule flowing within the irradiated area always finds a maximum and minimum distance known, with respect to the radiating source (this fact allows best settings and dosages besides lower consumption);
  iv. the proximity of the emitter of the rays at the material which must absorb the radiation (which can also be less than one millimetre) is obtained as a function of the thickness of the walls of the quartz tube chosen: this means that the energy efficiency of the radiation is much more effective when compared to conventional systems;
  v. The absence of any interposed wall, beyond the transparent SiO2, allows to drastically reduce the (thermal) inertia that otherwise would be encountered with the systems currently in use.

These peculiarities allow today's invention to operate with materials particularly sensitive to the temperature; these materials require a sudden change of the energy radiated during operation of the machine to avoid accidental melts or damages of materials that will slide inside. The melts would interrupt the cycles of industrial production, for example in the interlacing and texturizing known in the textile industry processes but also in the processes of "thermosetting" provided for in the industry of thermosetting polymers and in the preheating systems provided instead for thermoplastic polymers.

Flowing materials that change suddenly the speed of 18-20 m/s to 3 or 4 m/s and vice versa are common to different industry fields (especially at the start, settings, stops) and conventional sheathed armoured tubular elements would not have ability to adapt to these sudden changes, unlike today's invention which virtually has no thermal inertia according to the production and construction methods of the irradiating machine.

The commercial technical literature shows these concepts that distinguish the state of the art of microtubular heaters compared with the concentrate radiant heater based on tubes of pure fused quartz (the invention).

The innovative idea of the invention is thus based on the concept of enclosing in a tube (F—called outer tube—reflective ceramic casing), concentric and opaque towards IR/UV outwards radiation, the emitter (E) of such EMW to ensure that the same waves can only hit the materials sliding inside a second tube (D or C), transparent and concentric with the first, made of fused quartz (perfectly transparent to the wavelengths concerned), concentric and inside the first (F—which is rather exterior and matte), without scattering in the environment (or dispersing only minimally). Indeed it is mostly to use the radiated IR energy rather than the convectional or conductive one. Conduction and thermal convection require in fact other materials that act as a "bridge" and these interposed materials always act as an inertia element in the transfer of energy from the heating body (such as the resistive wire crossed by current) towards the elements to be heated.

Depending on the frequencies and the used materials, this system also allows the transfer of energy through the physical principle of electrical induction. The quartz material is also an excellent dielectric element to separate the wires to be heated by contact with the electrical resistance crossed by relatively large voltages and currents.

Conventional heating systems of metal wires, mostly inductive or resistive (in contact or sliding) involve considerable problems of adjustment practices (induction systems) or practices (resistive systems) that mostly spoil, deteriorate and even make it unusable, heated wire because mutated in colour or appearance and/or superficial aspect.

In particular the resistive systems involve a difficult management of the electric machine both for the electric arc ignition problems and for the changed resistivity whilst changing temperature conditions (both of the wires and the electrodes); in most metals the temperature increase leads to an increase of the intrinsic resistivity of the material, making it extremely difficult to control the homogeneous heating of it. The heating resistive systems then, are not able to transfer thermal energy (Joule) to the electrically non-conductive materials.

The inductive systems instead, in addition to working only with metals (except for the use of a special "susceptor"), they would need a continuous regulation of the emitted frequency of the energy in function of the wire diameter and the nature introduced in the inductor itself. This adjustment industriousness involves high plant costs and management.

For what regards the UV-C, the innovation is represented by bringing the sources of concentric electromagnetic emissions almost in fluid contact (or materials in general) to be treated (ie sterilize): in this way decreases the energy required for the treatment of the same expected result and consequently reduces installation, operating costs and system encumbrance.

Realization

For the realization of such a machine it will be needed:
a suitable electric generator calculated on the basis of the necessary powers and with the wave generation requests in terms of amplitude and frequency (not shown in the accompanying drawing);

i. a quartz tube (D) (SiO2) or substitute material, translucent or transparent, and in any case the most suitable material to the transparency of the wavelength of the desired rays, having relatively important thickness of the wall, on which wrap respectively:
   (a) for the IR, an electrical heating resistance realized in the conventional materials for this type of use but with particular regard to the temperatures reached and the irradiation frequencies;
   (b) for UV (in particular the UV-C), a strip of light emitting diodes (LED) with the emitting face facing towards the inside of the quartz tube on which the strip is wound, so as to point the emissions towards the centre of the duct of the fused quartz tube, where the materials to be treated flow;

ii. a possible second tube (C) of translucent (or transparent) quartz, always of particular thickness, smaller than the inner bore of the previous tube (D) so as to be introduced in it, which in turn can contain a residual space, of the desired diameter, necessary for running inside the material to be treated through the electromagnetic radiation resulting from the winding made on the previous tube (D)—this second tube (C) (for protection/wear) will be easily replaceable without disassembling the entire electric machine;

iii. The first tube (D), that one on which is wound by the resistive wire or of the LED strip, will in turn be inserted into another opaque tube (F), reflective, insulating and resistant to radiation and to heat transmission, realized with a ceramic or similar material, which (materials) should easily meet the most common needs. Ceramic materials seem to be the most suitable because they are very resistant to heat and thermal shock (a few of them) and at the same time, their light colour tends to reflect inwards (there where the materials to be treated are sliding) radiation from resistive wires (or UV-C led) which act to produce the radiated heat, as well as to contain them as much as possible within the heart of the electric machine;

iv. The opaque tube of ceramic or similar material, will in turn be insulated with insulation material (G) to further avoid release of thermal energy or radiated to the outside of the machine, as well as thermally isolating it to avoid burns to operators that operate on the machine itself as well as for the avoidance of UV rays leaks.

v. Finally, a metal or a metallized plastic sheet will enclose the whole and oppose the last filter to the dispersion of the radiation to the outside (H).

Operation

The materials to be treated will be made pass inside through the smaller diameter pipe, the one wrapped by the radiant spiral, which will then have the walls completely smooth and very hard, of vitreous nature (the fused quartz in fact), almighty resistant to acids also concentrated, and therefore with an expectation of long durability. If arranged with two quartz tubes, as previously described, the innermost tube to the system, the one closest to the material to be treated, may be in turn replaced with that of material and most appropriate size relative to the material to be treated, without having to disassemble the entire irradiating machine.

The infrared irradiating resistive wire (or the UV LED thread) string will be controlled by an electric generator (for example an inverter), which will be back-driven by a speed sensor (or by a flow meter) and/or by a thermocouple (or other sensor) that will follow the movement of materials within the quartz tubes and control the amount of energy to be irradiated to the material itself as a function of the desired sought-outlet temperature or the germicidal treatments.

The length of the tubes, of the resistors, the powers and frequencies used, of UVC LEDs, will be proportioned to the amount of radiated energy and to the mass and nature of materials that must be raised in temperature, as well as by the desired temperature difference or by the amount of radiation necessary to the sterilization processes; al will be in relation of the transit designed speed.

It is more than obvious, with regards to the IR treatment, that a part of the useful heating energy will arrive to the materials to be heated not only by radiation (and induction ed), but by convection.

Using particular construction features, such as to carry out a longitudinal cut on the tube and borrowing the use of "open metal coils", used by more than half a century for binding of calendars, blocks, notebooks and books (called commercially "wire-o"), it will be possible to interchange different emitters without disassembling the quartz tubes already installed in the plants.

Utility

The utility of the electrical machine thus conceived is highlighted in the possibility of treating materials having different physical forms (solid, liquid or gas or mixtures thereof), compared to the current known technique, obtaining the following contemporary benefits:

i. the materials to be treated are very close to the source of emission of electromagnetic radiation but never coming into contact with them;

ii. the treated materials are no longer subjected to the well-known unwanted physical changes of the treated materials such as in electric arcs and the problems of "descaling";

iii. the same system may either treat various materials without having to change the heating equipment or treatment. In other words metals or polymers may be processed in the same facilities;

iv. adjustments will be easier and immediate because, mainly taking advantage of the radiation instead of the convection and conduction systems, the important inertia which physically interpose in conventional installations are almost cancelled with those found in the invention, which can instead be described as "residual" (many materials will simply be suspended, and therefore without any physical contact with the parts of the "radiant tube");

v. the current running speed of the industrial plants that use radiation systems such as those described here will not suffer decreases, but will be increases (where possible);

vi. for the design and the forms of construction of the machine itself an important energy saving is expected: it derives from the lack of physical contact with the heated material which allows the realization of excellent insulation (to heat and EMW) causing the 'power (which is in high prevalence radiated) compacted remains inside the electrical machine itself, well insulated on the outside, low mass and small openings entry and exit, allows a much higher energy yield than used the systems (conventional and not) known to date.

vii. As regards the UV, the treatments performed with the concentric radiation system at 360 degrees around the materials improve the current state of the art:
   a) increasing the specific energy radiated per unit surface area (and therefore volume);
   b) eliminating the load losses in consequence of the application of the treatment carried out on sections of straight pipe instead of the described box;
   c) spreading the UV-C rays, only where they are needed;
   d) irradiating the predominantly perpendicularly materials.

As for a practical application, among many you can think to a milk which, without use of steam treatment plant, is able, on the same line, both to fulfill the UHT treatment (by IR) that sterilization (by UV) and everything in spaces much more content and a low power waste generated by the dispersion of the plants (ie steam plant which provides a heat exchange at the origin and one in the exchanger with the milk in addition to the energy loss in the steam transport).

As for more conventional applications, below we provide a list of synthesis absolutely not exhaustive but only relatively explanatory:
   i. instant hot water heaters;
   ii. in-line air/gas process heaters;
   iii. instant steam generators;
   iv. pre heaters for coextrusion of wires;
   v. heaters for producing enamelled wire for transformers, bobbins and coils;
   vi. in-line heat treatment facilities line of metal wires;
   vii. UHT treatment plants;
   viii. thermosetting lines for polymers;
   ix. commingling textile fixation plants;
   x. prepreg plants;
   xi. industrial sterilization of liquids;
   xii. industrial sterilization of finished products even in blisters;
   xiii. tubular flash pasteurization;
   xiv. industrial in-line sterilizer;
   xv. outdoors, solar powered, portable sterilizer for potable water

The invention claimed is:

1. A tubular concentrator for concentric irradiation of electromagnetic waves with high efficiency, consisting of at least two concentric tubes with an emitter interposed between them, to treat or affect various materials whether they are liquid, powdery, solid wire or a slurry, a section:
   I that uses electromagnetic radiation as a means of energy transfer,
   II which mainly radiates electromagnetic energy in close range mode, in the wavelength fields comprehended between 100 nanometers (UV-C) and the millimeter (IR-C),
   III radiating towards materials flowing into system in a manner: close, concentric, perpendicular;
   IV or with the emitter of electromagnetic waves wrapped in contact with a tube which can have wall thickness of less than one millimeter;
   V which can also work under vacuum or pressure;
   VI which may be devoid of physical contact with the materials to be treated; which could be realized indiscriminately in a fixed, movable or portable form, machine comprises:
   I at least two concentric tubes (D and F) open at both ends;
   II of which one, the inner one (D), transparent to the concerned wavelengths, for example made of pure quartz ($SiO2$), so that the same waves are attenuated as little as possible from the walls of this tube (D) during the process of radiated electromagnetic energy transfer from the emitter to the material to be treated;
   III at least one electromagnetic wave generator;
   IV at least one emitter of electromagnetic waves (E) represented for example by a spiral of resistive wire or a sequence of light-emitting diodes (LEDs) of the desired frequencies, which surmounts, wrapping it, the outside of the inner concentric tube (D) and it emits radiation towards the inside of the tube (D) itself, from the outer tube (F), of the two concentric tubes, which will hold features and electromagnetic waves emitted by the emitter of electromagnetic waves contained inside the container, to concentrate the greatest possible amount of energy towards the center of the inner pipe in which flows the material to be treated (A), for ideal values of reflective functions, a physical coefficient of reflection which is tending to and near to unity, associated with the transmission and absorption coefficients which are close to zero, having regard to the concerned wavelengths, opaque quartz tubes engineered to reflect electromagnetic waves form;
   V within the said inner quartz tube (D) can slide various materials, of various nature and features as: thread-like solids, liquids, powders, slurries, which are irradiated by a concentric beam of electromagnetic waves generated by an emitter wrapped on the outer surface of the inner tube (D) with the aim of reducing to minimum possible distance between the emitter and the material to be treated, which passes inside the quartz tube and which ensures the maximum exploitation of Lambertian theories and Stefan-Boltzmann;
   VI for short distances between transmitter and receiver, that measures are ranging from near contact, or 50 micrometers and 30 millimeters, which are increased as appropriate to the powers involved, or if there are major powers issued, there will be a greater distance; a best remains a "near to contact" distance;
   VII the outer tube (F) which shows its primary concentric mode reflective function, essentially with a high electromagnetic reflection index in the concerned spectrum of frequencies and which has also, a high insulating power; for high insulating power are meant those materials which can offer a low thermal conductivity, less than 5 W/m K at 20° C., besides a high reflection, next to an index-1, combined with smaller or almost absent transmission and /or electromagnetic absorption.

2. The tubular concentrator according to claim 1, wherein the outer tube (F) has a reflection coefficient related to the electromagnetic wavelength field between 0.5 and 1.

3. The tubular concentrator according to claim 1, wherein the outer tube (F) has a thermal conductivity at 20° C. comprised between 0 and 5 W/m K.

4. The tubular concentrator according to claim 1, further comprising an insulator cupola (G) 50 as to reduce the dispersion of electromagnetic radiation and thermal energy towards the outside of the tubular concentrator.

5. The tubular concentrator according to claim 1, further comprising a second inner tube (C), placed inside the inner tube (D).

6. The tubular concentrator according to claim 1, suitable for operating both under vacuum and in pressure, up to at least 275 MPa.

7. The tubular concentrator according to claim 1, provided with a longitudinal cut (L) suitable for the insertion of wire-shaped solid material to be radiated and with an emitter (E) having the shape of on open spiral.

8. The tubular concentrator according to claim 1, wherein said tubular concentrator is constructed inside a transportable casing provided both with and without the appropriate electrical power supplies for the autonomous operation of the tubular concentrator.

9. A tubular concentrator for concentric irradiation of electromagnetic waves suitable for treating various material, comprising an inner tube (D) and an emitter (E) of electromagnetic waves, the inner tube (D) being made of a material transparent to the electromagnetic waves, and the emitter (E) radiating electromagnetic waves comprised in the wavelength field between 100 nm and 1 mm and with the desired wave frequencies, said emitter being with an emitting face facing the inside of the tubular concentrator, and said emitting face surmounting and wrapping completely the outside of the inner tube (D), being in contact with said inner tube, wherein the material to be treated is liquid, powdery, slurry, gaseous, solid and a combination thereof, said material passing through the inside of the inner tube (D) so as to be radiated by the emitter (E), the distance between the emitter (E) and the material to be treated being between 50 µm and 30 mm.

* * * * *